(12) United States Patent
Ito et al.

(10) Patent No.: US 6,516,149 B2
(45) Date of Patent: Feb. 4, 2003

(54) AUTOMATIC FOCUSING CAMERA

(75) Inventors: Toru Ito, Saitama (JP); Hideo Yoshida, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/898,028

(22) Filed: Jul. 5, 2001

(65) Prior Publication Data
US 2002/0003957 A1 Jan. 10, 2002

(30) Foreign Application Priority Data
Jul. 6, 2000 (JP) ........................................ 2000-204753

(51) Int. Cl.$^7$ .............................................. G03B 13/36
(52) U.S. Cl. ......................................... 396/89; 396/542
(58) Field of Search .................................. 396/106, 542, 396/543, 89

(56) References Cited

U.S. PATENT DOCUMENTS

| | | | |
|---|---|---|---|
| 5,565,955 A | 10/1996 | Soshi et al. | 396/106 |
| 5,592,255 A | * 1/1997 | Wakabayashi et al. | 396/106 |

FOREIGN PATENT DOCUMENTS

| | | | |
|---|---|---|---|
| JP | 6-82892 | 3/1994 | G03B/17/02 |
| JP | 9-244116 | 9/1997 | G03B/17/02 |

* cited by examiner

*Primary Examiner*—W. B. Perkey
(74) *Attorney, Agent, or Firm*—Young & Thompson

(57) ABSTRACT

An automatic focusing camera has a release button (15) on a top wall of its camera body, and a release switch (32) is disposed underneath the release button such that the release switch is turned on by pressing down the release button. An autofocus IC (31) for calculating a subject distance is placed behind the release switch at about the same height as the release switch.

16 Claims, 3 Drawing Sheets

AUTOMATIC FOCUSING CAMERA

BACKGROUND OF THE INVENTION

1. Field of the Invention

The present invention relates an automatic focusing camera provided with an IC for use in an automatic focusing process.

2. Background Arts

Most of commercially available cameras are provided with an automatic focusing mechanism, a motor-driven zooming mechanism, an automatic film winding mechanism, and electronic circuits for operating these mechanisms. Among various types of automatic focusing mechanisms, an infrared active type has been popularly used in economy price compact cameras. The infrared active type automatic focusing mechanism uses a light projecting-receiving section having an infrared light emission diode (IRED) that emits infrared rays through a projection lens toward a photographic subject, and a position sending device (PSD) that receives through a photoreceptive lens the infrared rays reflected from the subject. A detection signal from the PSD is fed to an IC specific to the automatic focusing mechanism, hereinafter called the autofocus IC, and the autofocus IC processes the detection signal to produce a subject distance signal. Based on the subject distance signal, a lens drive device of the automatic focusing mechanism brings a taking lens to a focusing position under the control of a CPU.

In such an electronic compact camera, electronic components of control circuits, including the autofocus IC, are mounted or formed on flexible printed circuit boards, and the flexible printed circuit boards are folded into a small size to mount them in a narrow space inside the camera. Also a switch for detecting when and how much degree a release button is pressed down, hereinafter called the release switch, is mounted on the flexible printed circuit board, and is placed underneath the release button.

On the other hand, since the autofocus IC processes the detection signal from the PSD of the light projecting-receiving section, the autofocus IC is often located above the light projecting-receiving section that is usually mounted in an upper front portion of the camera. This structure is disclosed for example in Japanese Laid-open Patent Application No. 6-82892. In a camera disclosed in Japanese Laid-open Patent Application No. 9-244116, the autofocus IC is placed underneath the release button and above the light projecting-receiving section. In this camera, the light projecting-receiving section is mounted in an upper portion of the camera, and a printed circuit board for a control circuit is placed above the light receiving side of the light projecting-receiving section, and the release button is provided on the top side of the control circuit board, whereas the autofocus IC is mounted on the bottom side of the control circuit board.

There is a camera wherein the autofocus IC and the release switch that are placed underneath the release button, and is not placed above the light projecting-receiving section. Since the release button is usually located on a top side of the camera body, where the autofocus IC is placed under the release button, a mounting space of a certain height must be provided in an upper portion of the camera, enough to mount the release button, the release switch, the autofocus IC, the flexible printed circuit board and so forth. In practice, a hard base plate is inserted in between the release switch and the autofocus IC, so that the pressure applied onto the release button may not be transmitted to the autofocus IC. The base plate still more increases the necessary height of the mounting space. Because of such a mounting space of a certain height, the height of the camera body cannot be reduced so much.

Also where the autofocus IC is placed above the light projecting-receiving section, it is difficult to reduce the height of the camera body. Where the release button, the release switch and the autofocus IC are placed above the light projecting-receiving section, reduction of the camera body height is still more difficult.

Moreover, where the autofocus IC is placed underneath the release switch, the autofocus IC is sometimes affected by noises that are generated from the release switch because of chattering or the like when the release switch is turned on or off, or by a ground line connected to the release switch. In that case, the subject distance signal from the autofocus IC becomes inaccurate.

SUMMARY OF THE INVENTION

In view of the foregoing, an object of the present invention is to provide an automatic focusing camera with an autofocus IC, which is improved in flexibility of dimensioning the camera body, especially in height of the camera body, and also makes the autofocus IC less affected by the noises.

According to the present invention, in an automatic focusing camera that automatically focuses a taking lens on a subject distance detected based on a detection signal from a light receiving element receiving light reflected from a photographic subject, an autofocus IC for calculating the subject distance from the detection signal is disposed at a position that is approximately equal in height to a release switch, and is shifted rearward of a camera body from the release switch. The release switch is disposed underneath a release button that is provided on a top wall of the camera body.

Since the autofocus IC is placed rearward from the release switch at about the same height as the release switch, there is no need for providing a mounting space for the autofocus IC under the release button. Therefore, the entire height of the camera body may be reduced by the mounting space for the autofocus IC. In addition, the autofocus IC is less affected by the noises generated from the release switch, because the distance of the autofocus IC from the release switch is increased as compared with the case where the autofocus IC is placed underneath the release switch. Furthermore, the noises from the ground line as well as from the release switch cannot easily overlap the detection signal from the light receiving element and the output signal from the autofocus IC as well.

According to a preferred embodiment, the autofocus IC and the release switch are mounted on a flexible printed circuit board that is made of a single sheet having a plurality of sections connected to each other through flexible strips. The autofocus IC, the release switch and the light receiving elements are mounted on different ones of the sections from each other, and are disposed in predetermined positions by bending the flexible strips. This embodiment facilitates mounting the respective elements for the automatic focusing.

By mounting the autofocus IC in an inclined posture to a horizontal plane of the camera body, it becomes possible to dispose the autofocus IC in an upper position of the camera body, without the need for increasing the thickness of the camera body. Especially where the top wall of the camera body slopes down to the rear wall, this configuration is desirable, because it makes possible to dispose the autofocus IC behind the release switch without the need for redesigning the camera body.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENTS

Figure 1:
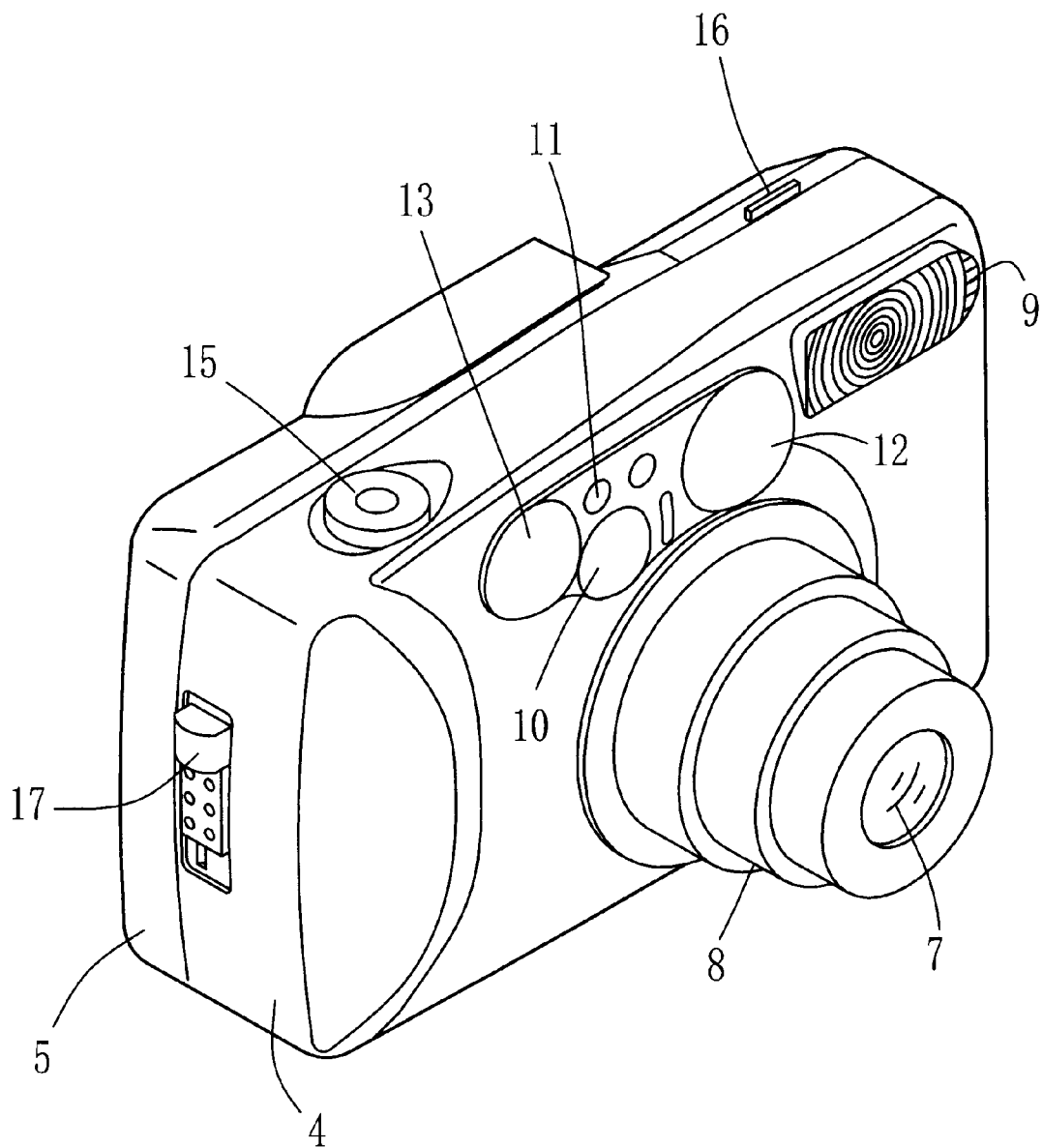
FIG. 1 is a perspective view illustrating an appearance of a camera according to an embodiment of the present invention.
Figure 2:
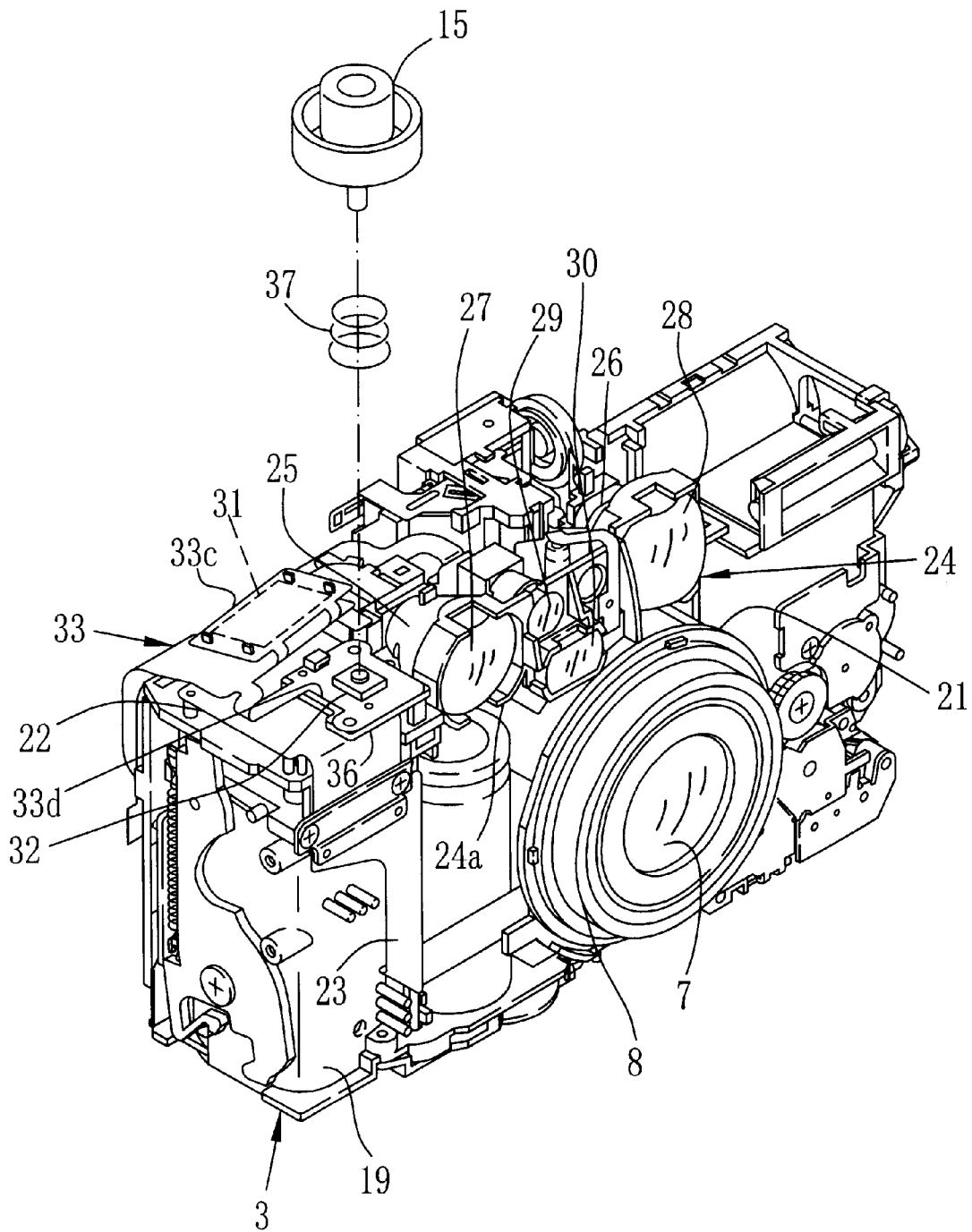
FIG. 2 is a perspective view illustrating the interior of the camera of the embodiment of FIG. 1.

As shown in FIGS. 1 and 2, a camera of the present embodiment is constituted of a body frame 3 mounted with electronic and photographic mechanisms, and front and rear covers 4 and 5 covering the front and rear sides of the body frame 3.

A lens barrel 8 holding a taking lens 7 is located at a center of the front side of the camera. A flash projector 9 is located at an upper-right position of the front side of the camera, whereas a finder objective window 10, a photometric window 11, a light projecting window 12 and a light receiving window 13 are located in an upper middle portion of the front side of the camera. The lens barrel 8 protrudes forward when a power switch, that is not shown but provided on the rear side of the camera, is turned on. When the power switch is turned off, the lens barrel 8 retracts into the camera body. The amount of protrusion of the lens barrel 8 and thus the focal length changes with operation on a zoom button that is not shown but provided on the rear side of the camera. The flash projector 9 also cooperates with the zoom button, so as to change the illumination range in accordance with the focal length.

A release button 15 is located on a left side of a top surface of the camera. A battery chamber lid 16 is provided behind the flash projector 9, for loading or unloading not-shown batteries into or out of a battery chamber.

Figure 3:
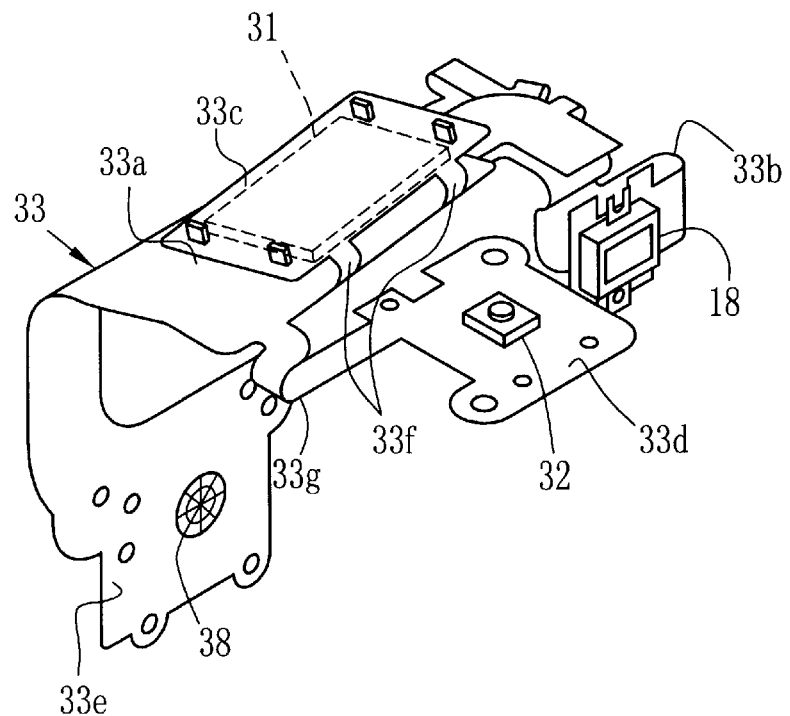
FIG. 3 is a perspective view of a flexible printed circuit board having an autofocus IC and a release switch mounted thereon.

The release button 15 is designed to stop at a half-pressed position when a small pressure is applied thereto, and may be moved further to a full-pressed position by a larger pressure. When the release button 15 is half pressed, a photo sensor, that is not shown but disposed behind the photometric window 11, measures a subject brightness. Simultaneously, an infrared ray is projected from a not-shown infrared light emitting diode (IRED) toward a photographic subject through the light projecting window 12. The infrared ray is reflected from the subject and is received by a position sensing device (PSD) 18 that is disposed behind the light receiving window 13, as shown in FIG. 3, so a subject distance is detected. When the release button 15 is pressed further to the full-pressed position, the taking lens 7 is focused on the subject in accordance with the detected subject distance. Thereafter, a not-shown electronic shutter is activated to make an exposure with a shutter speed and an aperture size which are determined by the subject brightness.

An operation member 17 provided on the left side of the camera may be slid up and down, to close and open a not shown bottom lid of a cartridge chamber 19 (see FIG. 2) that is integrally formed on the left side of the body frame 3. So long as a photo filmstrip of a photo film cartridge as loaded in the cartridge chamber 19 is located outside the cartridge shell, the operation member 17 is locked to inhibit opening the bottom lid.

A not-shown film take-up chamber is formed integrally on the right side of the body frame 3, for taking up the photo filmstrip after each exposure. A stationary barrel 21 for holding the lens barrel 8 is disposed in between the film take-up chamber and the cartridge chamber 19.

A main flexible circuit board 22 is mounted or formed on the body frame 3, and extends from the rear side of the body frame 3 through the top side to the front side of the cartridge chamber 19. The main flexible circuit board 22 has an approximately L-shape as it is unfolded. Although they are omitted from the drawings, a plurality of electronic elements are mounted on the main flexible circuit board 22, to constitute various kinds of circuits. Concretely, on the rear side portion of the main flexible circuit board 22 are mounted a CPU for controlling the respective elements of the camera, a photo sensor for detecting perforations of the photo filmstrip, and a magnetic head for reading and writing data from and on a magnetic recording layer of the photo filmstrip. Contacts for the power switch and many other kinds of operation buttons are also formed on the rear side portion of the main flexible circuit board 22. On the top side portion of the main flexible circuit board 22 are mounted a motor driver IC for controlling driving a zoom motor for the lens barrel 8 and a film advancing motor, a booster circuit for boosting up the power source voltage from the batteries, and a drive circuit for driving the IRED.

The front side portion of the main flexible circuit board 22 is connected to one end of another flexible circuit board 23 that is led out from the lens barrel 8. The other end of the flexible circuit board 23 is connected to the electronic shutter that is mounted in the lens barrel 8, so the electronic shutter is controlled by the CPU on the main flexible circuit board 22 through the flexible circuit board 23.

A light measuring and range finding unit 24 is disposed above the stationary barrel 21. The light measuring and range finding unit 24 is an assembly constructed by mounting necessary parts for photometry and range finding onto a base member 24a. Specifically, a pair of light shielding barrels 25 and 26 are provided on opposite horizontal ends of the base member 24a. A light receiving lens 27 is mounted in a front end of the light shielding barrel 25, whereas a light projecting lens 28 is mounted in a front end of the other light shielding barrel 26. Behind rear ends of the light shielding barrels 25 and 26 are placed the PSD 18 and the not-shown IRED respectively. As will be described in detail later, the PSD 18 is mounted on a third flexible circuit board 33.

The infrared ray from the IRED travels through the light shielding barrel 26, and is projected through the light projecting lens 28 and the light projecting window 12 toward the subject. The infrared ray reflected from the subject enters through the light receiving window 13 and the light receiving lens 27, travels through the light shielding barrel 25, and falls on the PSD 18.

A photometric light receiving lens 29 and a finder object lens 30 are mounted in between the light shielding barrels 25 and 26. The photometric light receiving lens 29 is placed behind the photometric window 11, and the not-shown photo sensor for detecting the subject brightness is disposed behind the photometric light receiving lens 29. A not-shown eyepiece lens is mounted in an upper rear side portion of the base member 24a. In between the eyepiece lens and the finder objective lens are mounted a prism for refracting a finder optical path and a zooming mechanism for zooming the finder optical system in cooperation with the zooming of the taking lens 7, though they are not shown in detail in the drawings.

The third flexible circuit board 33 is also mounted on the body frame 3. As shown in detail in FIG. 3, an autofocus IC 31, a release switch 32 and other relating elements are mounted on the third flexible circuit board 33. The third flexible circuit board 33 is formed as a single sheet consisting of a main surface 33a, a sensor section 33b, an AF section 33c, a switch section 33d and a rear side section 33e. An automatic exposure (AE) control circuit is formed on the main surface 33a of the third flexible circuit board 33, for processing the photometric signal that represents the subject brightness. The main surface 33a is placed above the cartridge chamber 19, in an upper position than the main flexible circuit board 22, and on the rear side of the camera. The sensor section 33b extends from the right side of the main surface 33a in the mounted position, and is folded at several portions, such that a distal end of the sensor section 33b is placed behind the light shielding barrel 26 that holds the light receiving lens 28 in the front. The PSD 18 is mounted on the distal end of the sensor section 33b, so the PSD 18 receives the infrared ray that is reflected from the subject and enters through the light receiving lens 27. The PSD 18 outputs a detection signal that represents an incident position of the infrared ray on the PSD 18, i.e. an incident angle of the infrared ray on the light receiving lens 27.

The AF section 33c is connected to the main surface 33a through a pair of flexible connection strips 33f that protrude forward from the main surface 33a. The AF section 33c is placed over the main surface 33a by bending the connection strips 33f about 180 degrees. Where the AF section 33c is placed over the main surface 33a, the autofocus IC 31 is on one side of AF section 33c that is opposed to the main surface 33a.

The autofocus IC 31 processes the detection signal from the PSD 18 to output an accurate subject distance signal, for example, by eliminating ambient light components, improving the S/N ratio properties and so forth. The subject distance signal from the autofocus IC 31 is sent to the CPU on the main flexible circuit board 22 through a contact 33e that is provided on the rear side portion 33e of the third flexible circuit board 33. Based on the subject distance signal, the CPU drives the zoom motor through the motor driver IC, to focus the taking lens 7.

Figure 4:
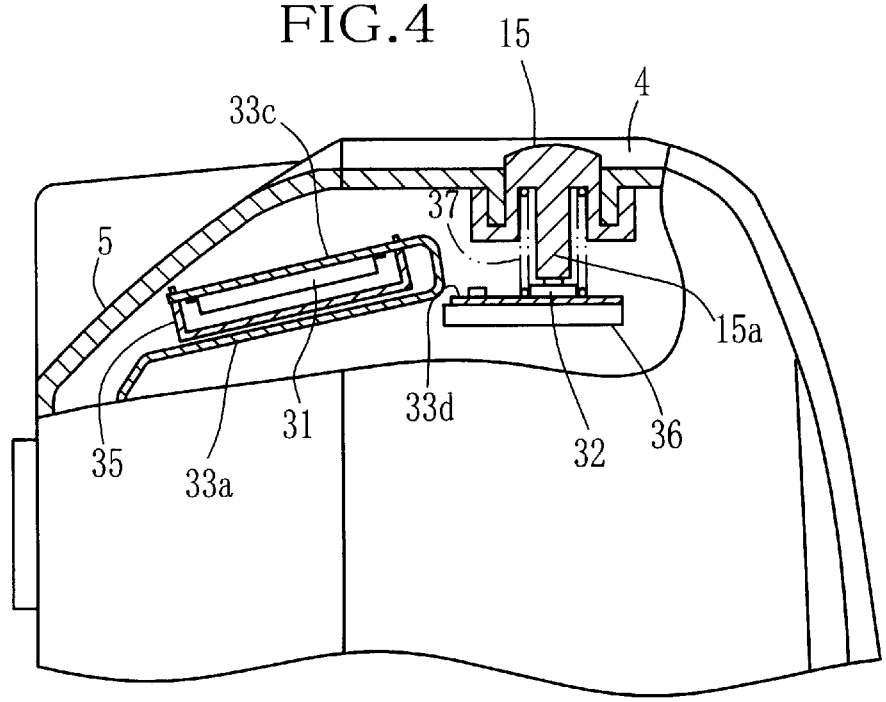
FIG. 4 is a fragmentary section of the camera, illustrating arrangements of a release button, the release switch and the autofocus IC.

As shown in FIG. 4, a noise shielding member 35 that shields the autofocus IC 31 from electric noises is mounted on the AF section 33c. Also the AF section 33c itself is formed with a circuit pattern for the noise shielding. A connection strip 33g protrudes forward from a left portion of the front edge of the main surface 33a and extends to the left of the main surface 33a, and the switch section 33d is provided on a distal end of the connection strip 33g. The switch section 33d has a substantially rectangular shape, and is placed on the front side of the main surface 33a by bending the connection strip 33g about 180 degrees. As shown in FIG. 2, the switch section 33d is thus placed underneath the release button 15, and is supported from the bottom side by a flat table 36 that is securely mounted to the body frame 3. The release switch 32 is mounted on the top side of the switch section 33d.

As shown in FIGS. 2 and 4, a coiled spring 37 is mounted in between the release button 15 and the switch section 33d, to urge the release button 15 upward. So the release button 15 is held in an upper position by the force of the coiled spring 37 insofar as the release button 15 is pressed down. Upon the release button 15 being pressed, a pressing pin 15a formed integrally on the bottom side of the release button 15 presses the release switch 32. For example, the release switch 32 is provided with first to third terminals, of which the first terminal is connected to a ground line, and the second and third terminals are output terminals. Concretely, when the release button 15 is pressed halfway, a switch consisting of the first and second terminals of the release switch 32 is turned on, to a half-press detection signal from the second terminal. On the other hand, when the release button 15 is pressed to the full, a switch consisting of the first and third terminals of the release switch 32 is turned on, to output a full-press detection signal from the third terminal. These detection signals from the release switch 32 are sent to the CPU, and are used as trigger signals for starting different photographic processes from each other.

The rear side portion 33e of the third flexible circuit board 33 overlies the rear side portion of the main flexible circuit board 22. As shown in FIG. 3, the rear side portion 33e is provided with a radial connecting terminal 38, and the rear side portion of the main flexible circuit board 22 is also provided with a radial connecting terminal of the same shape as the terminal 38. Where the rear side portion 33e overlies the rear side portion of the main flexible circuit board 22, the radial connecting terminal 38 is connected to that of the main flexible circuit board 22, so the circuits on the third flexible circuit board 33 are electrically connected to the circuits on the main flexible circuit board 22.

The main surface 33a and the AF section 33c are inclined to a horizontal plane when the camera stands in its upright posture. In this embodiment, rear and left sides of the main surface 33a and the AF section 33c are set lower than their front and right sides, as shown in FIGS. 3 and 4. This configuration makes it possible to dispose the autofocus IC 31 in an upper position of the camera body behind the release switch 32, without the need for increasing the thickness of the camera body. Especially where the top wall of the rear cover 5 slopes down to the rear side wall, as shown in FIGS. 1 and 4, for the sake of making the camera body look slimmer, this configuration is desirable, because it makes possible to dispose the autofocus IC 31 behind the release button 15 while maintaining the preferable design for slim appearance.

Since the autofocus IC 31 is placed behind the release switch 32 at about the same height as the release switch 32, there is no need for providing a mounting space for the autofocus IC 31 under the release button 15, so the entire height of the camera body may be reduced by the mounting space for the autofocus IC 31. Accordingly, the camera of the present invention permits reducing the height of the camera body without increasing the thickness or sacrificing the slim appearance.

In addition, since the autofocus IC 31 is placed more distant from the release switch 32 as compared with the case where the autofocus IC is placed underneath the release switch, the autofocus IC 31 is less affected by the noises generated from the release switch 32. Furthermore, the noises from the ground line as well as from the release switch 32 cannot easily overlap the detection signal from the PSD 18 and the subject distance signal from the autofocus IC 31. So the reliability of the subject distance signal and thus the accuracy of focusing are improved.

Although the present invention has been described so far with respect to the preferred embodiment shown in the drawings, the present invention is not to be limited to the above embodiment but, on the contrary, various modifications will be possible to those skilled in the art without departing from the scope of claims appended hereto.

What is claimed is:

1. An automatic focusing camera that automatically focuses a taking lens on a subject distance detected based on a detection signal from a light receiving element that receives light reflected from a photographic subject, the camera comprising:

a camera body comprising a top wall, a front wall and a side wall;

a release button provided on said top wall of said camera body, said taking lens being arranged on said front wall, and said side wall being immediately adjacent both said front wall and said top wall;

a release switch disposed underneath said release button to detect said release button being pressed down, said release switch being disposed between said light receiving element and said side wall of said camera body; and an autofocus IC for calculating the subject distance from the detection signal, said autofocus IC being disposed at a position that is approximately equal in height to said release switch, and is shifted rearward of the camera body from said release switch, said autofocus IC being disposed between said light receiving element and said side wall of said camera body.

2. An automatic focusing camera as recited in claim 1, wherein said autofocus IC and said release switch are mounted on a flexible circuit board.

3. An automatic focusing camera as recited in claim 2, wherein said flexible circuit board is made of a single sheet having a plurality of sections connected to each other through flexible strips, and said autofocus IC, said release switch and said light receiving elements are mounted on different ones of said sections from each other, and are disposed in predetermined positions by bending said flexible strips.

4. An automatic focusing camera as recited in claim 1, wherein said autofocus IC is mounted in an inclined posture to a horizontal plane of the camera.

5. An automatic focusing camera as recited in claim 4, wherein said autofocus IC slopes down rearward of the camera body.

6. An automatic focusing camera as recited in claim 1, wherein said autofocus IC is placed behind said release switch.

7. An automatic focusing camera as recited in claim 6, wherein said light receiving element is placed on one horizontal side of said release switch.

8. An automatic focusing camera as recited in claim 1, wherein said autofocus IC is covered with a noise shielding member for shielding said autofocus IC from electric noises.

9. An automatic focusing camera that automatically focuses a taking lens on a subject distance detected based on a detection signal from a light receiving element that receives light reflected from a photographic subject, the camera comprising:

a release button provided on a top wall of a camera body;

a release switch disposed underneath said release button to detect said release button being pressed down, said release switch having a first mount surface opposite said release button; and an autofocus IC for calculating the subject distance from the detection signal, said autofocus IC being disposed at a position that is approximately equal in height to said release switch, and is shifted rearward of the camera body from said release switch, said autofocus IC having a second mount surface defining a plane that is inclined away from a plane defined by said first mount surface of said release switch.

10. An automatic focusing camera as recited in claim 9, wherein said plane defined by said first mount surface intersects said autofocus IC.

11. An automatic focusing camera as recited in claim 9, wherein said autofocus IC and said release switch are mounted on a flexible circuit board in the condition that said first and second mount surfaces contact said flexible circuit board.

12. An automatic focusing camera as recited in claim 11, wherein said flexible circuit board is made of a single sheet having a plurality of sections connected to each other through flexible strips, and said autofocus IC, said release switch and said light receiving elements are mounted on different ones of said sections from each other, and are disposed in predetermined positions by bending said flexible strips.

13. An automatic focusing camera as recited in claim 9, wherein said autofocus IC slopes down rearward of the camera body.

14. An automatic focusing camera as recited in claim 9, wherein said autofocus IC is placed behind said release switch.

15. An automatic focusing camera as recited in claim 14, wherein said light receiving element is placed on one horizontal side of said release switch.

16. An automatic focusing camera as recited in claim 9, wherein said autofocus IC is covered with a noise shielding member for shielding said autofocus IC from electric noises.

* * * * *